March 21, 1950      W. R. BLISS      2,500,924
CALCULATING DEVICE
Filed Oct. 31, 1945
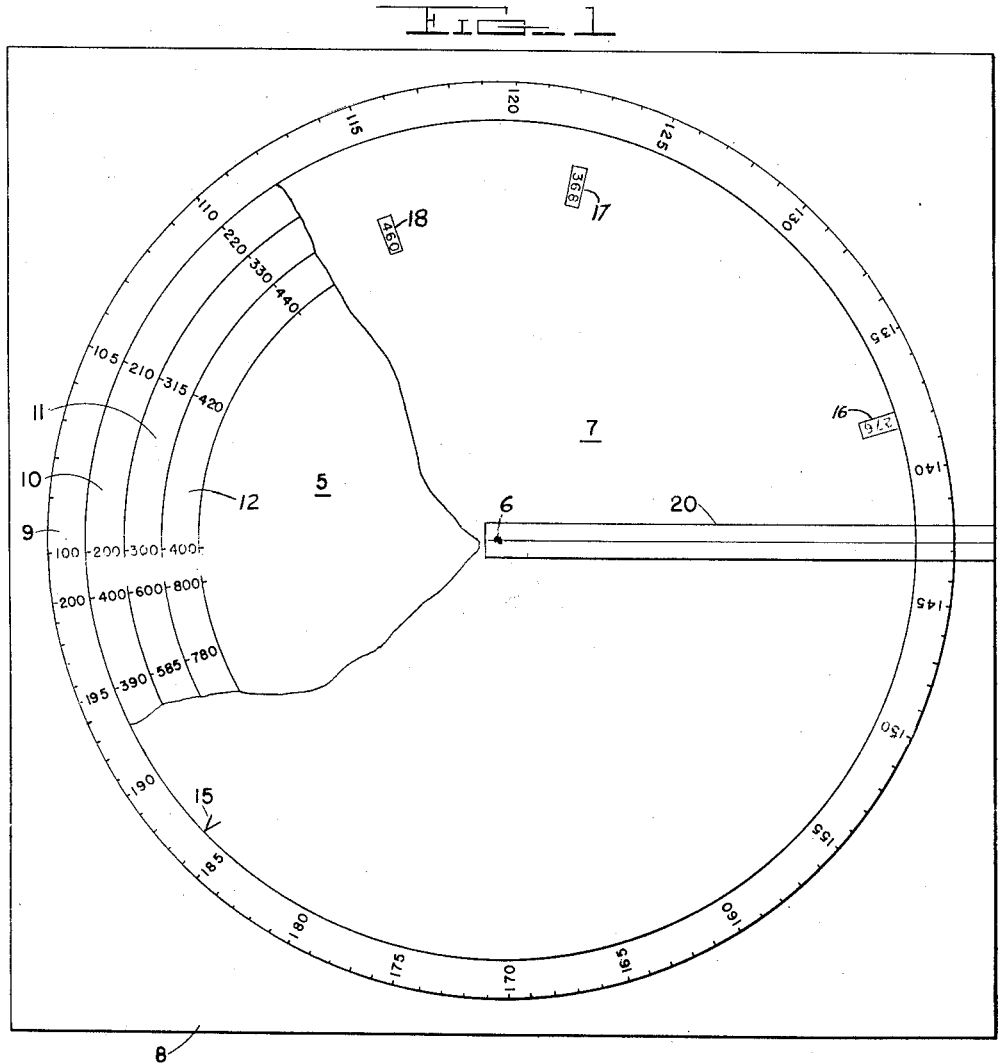
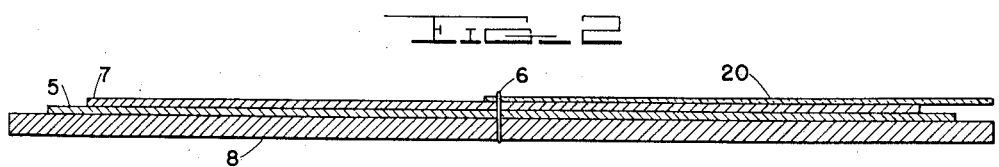
Inventor
WILLIAM RODERIC BLISS
By Ralph L Chappell
Attorney Patented Mar. 21, 1950

2,500,924

UNITED STATES PATENT OFFICE 2,500,924

CALCULATING DEVICE

William Roderic Bliss, Washington, D. C.

Application October 31, 1945, Serial No. 625,932

5 Claims. (Cl. 235—84)

(Granted under the act of March 3, 1883, as amended April 30, 1928; 370 O. G. 757)

This invention relates to calculating devices, and more particularly, to a calculating device for determining an unknown frequency value from two harmonics thereof.

In ascertaining the frequency of a signal, and particularly where the frequency has a high value with low power, one practice is to employ a heterodyne frequency meter and to beat the signal of unknown frequency with harmonics of the heterodyne frequency meter output to obtain at least two zero beat frequency values. If the unknown frequency is lower than the lowest frequency of the heterodyne oscillator, harmonics of the unknown signal are used to produce beats with the fundamental frequency of the oscillator. If the unknown is higher than the highest frequency of the heterodyne oscillator, then harmonics of the oscillator are employed. In some cases harmonics of the oscillator are beaten with harmonics of the unknown signal to produce a response on the meter. By adjusting the frequency meter to obtain at least two zero beat frequency values, then, by interpolation, the frequency of the signal being measured may be calculated.

For example, when measuring exact frequencies with the aid of a frequency standard and multi-vibrator providing equally spaced harmonic points, the signal from the frequency standard is mixed with the signal of unknown frequency and the points at which the unknown frequency and the nearest lower and higher harmonics appear on the dial of the frequency meter are noted. Knowing the exact frequency of the harmonic points, the unknown frequency can then be determined by interpolation, as follows:

$$f_x = f_1 - \frac{S_x - S_1}{S_2 - S_1}(f_2 - f_1)$$

wherein $f_x$ equals the unknown frequency, $f_1$ the first harmonic point, $f_2$ the second harmonic point, $S_1$ the dial setting for $f_1$, $S_2$ the dial setting for $f_2$ and $S_x$ the dial setting for $f_x$.

It will be readily apparent that the interpolation method, while feasible, requires considerable calculation. Furthermore, the method is subject to producing false results due to errors in reading the frequency meter, spurious or extraneous responses of the meter, and mistakes in calculation. Any values, correct or not, obviously may be inserted for the symbols and an answer obtained by calculation, yet no indication will be had that the answer is incorrect or impossible.

An object of the present invention is to provide a simple and efficient calculating device, and more particularly a calculating device for determining a frequency value from two harmonics thereof.

In accordance with one embodiment of this invention, a calculating device may be provided comprising a disc having an annular scale marked about its outer portion and corresponding to the frequency range of the heterodyne frequency meter with which this device is intended to be employed. The scale is so calibrated that the numbers progress with a logarithmic spacing. Successively smaller annular scales are marked on the disc and concentrically located with respect to the center thereof, these scales being integral multiples of the other scales and representing harmonics of the frequency meter oscillator, the fundamental frequency of which is represented by the outside scale. A circular mask is rotatably mounted over the disc and is provided with a plurality of angularly and radially spaced windows, and an index member extends radially from the center of the device beyond the periphery of the larger disc.

Other objects and advantages of the present invention will be apparent from the following detailed description thereof, taken in conjunction with the drawing, wherein:

Fig. 1 is a plan view of a calculating device constructed in accordance with this invention, a portion of the mask being broken away to facilitate illustration; and Fig. 2 is a sectional illustration of the device disclosed in Fig. 1.

The calculating device of this invention is intended to be employed in conjunction with a heterodyne frequency meter so constructed that it may be tuned over a limited range, usually 2–1 in frequency, and audible beat notes detected between the harmonics of the oscillator frequency and the unknown signal. Since the order of the harmonics is not at once known, two readings from the meter must be taken. If the first reading has a value of $a$ the unknown frequency $f$ is equivalent to $na$ wherein $n$ is an integer. If the second reading at a higher frequency has a value $b$, then $f$ equals $(n-1)b$. The purpose of the calculating device of this invention is to find the desired value of $f$ by two simple settings of the device to the values $a$ and $b$.

Referring now to the drawings, it will be seen that the device comprises a large disc or circular dial plate 5 having a pivot pin 6 mounted in its center, the pivot pin 6 rotatably supporting a circular mask 7 on the upper surface of the disc 5.

For convenience in operation the device may be rotatably supported on a base 8 by the pivot pin 6. The disc 5 is provided with a plurality of annular calibrated scales 9, 10, 11 and 12, concentrically marked on the surface thereof. The scales are so calibrated that the numbers progress with a logarithmic spacing; that is to say the arrangement around the disc would be the same as between 1 and 2 on an ordinary slide rule "C" scale. The outer scale 9 may be calibrated to correspond to the range of frequency of the heterodyne frequency meter with which the device is primarily intended to be employed while the inner rings are marked in integral multiples of the outer rings. Thus, as shown in the drawings, the outer scale has a range of from 100 to 200 while the adjacent scale 10 has a range of from 200 to 400, the scale 11 from 300 to 600, and the scale 12 from 400 to 800.

The essential solution desired of this calculation device is of the two equations: $f = na$ and $f = (n-1)b$. Since $n$ (the order of the harmonic) is a small integer in practice, $$\frac{n}{n-1} = \frac{b}{a} = \frac{2}{1}, \frac{3}{2}, \frac{4}{3}, \frac{5}{4}, \frac{6}{5}$$

etc. The markings on the outer scale of the rule are thus spaced according to the logarithms of the $b$ or $a$ found on it, so that a fixed distance along the periphery is equivalent to $\log b - \log a$, which in turn equals $$\log \frac{b}{a}$$

Since $$\frac{b}{a}$$

can only have certain values, that is, $$\frac{2}{1}, \frac{3}{2}$$

etc., only certain values of $$\log \frac{b}{a}$$

can properly exist and only certain spacings along the perimeter of the disc are possible for correct responses. This is important in that by reason of this fixed relation, spurious responses are automatically indicated and the calculating device allows only integral multiples of the frequency meter reading to appear as answers. Thus the operation of this device is superior to interpolation.

The mask 7 which is rotatably mounted over the disc has marked at one point on its edge an arrows 15 and a plurality of angularly and radially spaced windows 16, 17, and 18, are formed through the mask, the mask being of such a diameter that the outer scale 9 is exposed. An index member 20 such as a hairline indicator, is mounted on the pin 6 above the mask 7 and extends from the center of the device to a point slightly beyond the edge of the disc 5. It is preferably semi-permanently fixed, but it will be apparent that if the disc 5 is made stationary instead of rotatably then it would be necessary that the index member 20 be pivotable. The position of any window as measured from the position of the arrow on the mask is determined from the possible values of $$\frac{b}{a}$$

and is equal to $$\log \frac{b}{a}$$

For instance, if a sub-harmonic relation of $$\frac{3}{2}$$

is assumed, a spacing from the arrow to the window 16 of $$\log \frac{3}{2}$$

is desired. This is found most conveniently by setting the arrow at 150 on the outer scale and cutting a window beside the 100 mark. This can be done because $$\frac{150}{100} = \frac{3}{2}$$

and the outer numbered scale is already logarithmically spaced. Since two times the desired result is equal to the upper frequency or three times the lower frequency, the window 17 is located over the scale 11 beside the 100 mark and immediately above the number 300. The same procedure is followed to locate the windows for the other possible values of $$\frac{b}{a}$$

It is of course possible to reverse the position of the arrow and the windows, in which case the arrow would point to 100 in the above example and the window placed over the second scale beside the marking 150 in order to indicate 300. Thus, in practice, the windows are spaced from the arrow around the mask according to the formula $$\log \left(\frac{b}{a}\right)$$

where $$\frac{b}{a}$$

has the values:

$$\frac{3}{2}, \frac{4}{3} \text{ and } \frac{5}{4}$$

etc. They are measured on the same scale as that used for the numerical calibration. Radially the windows are placed to indicate the order of the harmonic, the choice of a scale, of course, depending on the value of $$\frac{b}{a}$$

for that window and whether the arrow points to a higher or lower frequency than that beside the window. While but three windows and harmonic scales have been shown, thus making it possible to utilize fourth harmonics, it will be understood that any convenient number of windows and scales may be employed.

In order to illustrate the operation of this calculating device, it will be described in conjunction with the use of a conventional heterodyne frequency meter having an oscillator range of from 100 to 200 megacycles; it will be understood, of course, that the calculating device may be calibrated to be employed with any oscillator range. Assuming that the first response on the meter occurs at 165 megacycles. The arrow 15 on the mask 7 is then set at 165. Then let it be assumed that the second response occurs at 110 megacycles. Then the mask and disc are rotated together until the marking 110 falls under the hairline indicator. The window 17 then falls under the hairline and exposes the number 330 megacycles on the third scale, which is the frequency of the unknown signal. The answer obtained by the calculating device may be readily checked by adjusting the meter to find still another response and then adjusting the calculating device accordingly.

In order to illustrate how this calculating device automatically indicates a spurious response or error, the following example is given: let it be assumed that the first response on the meter is 160 megacycles. The same procedure is followed and the mask arrow 15 is set at 160. Let it be assumed that the next response occurs at 130 megacycles. The mask and disc are then rotated together until 130 is under the hairline. However, it will be found that no window falls on the hairline; this is a trouble signal. Investigation may disclose that the 130 megacycle response comes from a source other than the oscillator under test. Accordingly, a further adjustment of the heterodyne frequency meter is made and let it be assumed that the next response occurs at 120 megacycles. The mask and disc are then rotated until the marking 120 occurs under the hairline. At this point the window on the inner scale exposes the number 480, which is the frequency of the unknown signal. Here if calculation, that is, interpolation, has been employed instead of the calculating device of this invention a false result would have been obtained. This is shown by the following formula:

$$\frac{1}{130} - \frac{1}{160} = \frac{1}{f}$$

$f = 694$ megacycles. It will be apparent that the false result 694 is an integral multiple of neither 130 nor 160. The calculating device of this invention, thus, automatically rejects a result which is not an integral multiple of both responses.

It will be understood that while but one embodiment of this invention has been shown and described, many changes and modifications may be made therein without departing from the spirit or scope of the present invention.

The invention shown and described herein may be manufactured and used by or for the government of the United States of America for governmental purposes without the payment of any royalties thereon or therefor.

What is claimed is:

1. In a calculating device, a disk upon which is graduated an annular, logarithmic scale, said disk having a plurality of annular logarithmic scales concentrically located within said first scale and graduated on said disk with reference indicia in radial alignment, said scales being sequentially calibrated and so located that if the calibration on the outer scale be assigned a value of one, the next adjacent inner scale will have a value of two, and succeeding scales correspondingly higher values and a mask rotatably mounted on said disk and having a plurality of angularly and radially spaced windows formed therethrough in predetermined relation with said scales.

2. A calculating device comprising a circular disk having a scale adjacent its periphery, a circular mask rotatably mounted on the axis of said disk and of a size such that when mounted on said disk the scale adjacent its periphery is exposed, said disk having a plurality of inner scales located within said first scale, the divisions of said scales being arranged logarithmically and the variation between successive adjacent numerals on the several scales bearing a fixed integral relation, an index member extending radially from the axis of rotation over said mask and beyond the periphery of said disk, said disk and said index member mounted for rotation relative to each other, said mask having a plurality of spaced windows formed therethrough, the angular spacing of said windows from a point marked on the periphery of said mask being according to the log of $$\frac{3}{2}$$

for the first window, $$\frac{4}{3}$$

for the second window, $$\frac{5}{4}$$

for the third window and correspondingly for successive windows, the radial spacing of the windows being such that one window is located over each inner scale.

3. A calculating device comprising a rotatable disk having an annular scale adjacent its periphery, a circular mask rotatably mounted on the axis of said disk and of a size such that when mounted on said disk the scale adjacent its periphery is exposed, said disk having a plurality of additional scales located concentrically within said first scale, the division of said scales being arranged logarithmically and the variation between successive adjacent numerals on the several scales bearing a fixed successive integral relation, said mask having a plurality of spaced windows formed therethrough and an index point marked on its periphery, the angular spacing of said windows from said point being according to the log of $$\frac{3}{2}$$

for the first window, $$\frac{4}{3}$$

for the second window, $$\frac{5}{4}$$

for the third window, and correspondingly for successive windows, the radial spacing of the several windows being such that one window is located over each scale except the outer scale.

4. A calculating device comprising a rotatable disc having an annular scale adjacent its periphery, a circular mask rotatably mounted on the axis of said disk and of a size such that when mounted on said disk the scale adjacent its periphery is exposed, said disk having a plurality of additional scales located concentrically within said first scale, the division of said scales being arranged logarithmically and the variation between successive adjacent numerals on the several scales bearing a fixed successive integral relation, said mask having a plurality of faced windows formed therethrough and an index point marked on its periphery, the angular spacing of said windows from said point being according to the log of $$\frac{3}{2}$$

for the first window, for the second window, $$\frac{4}{3}$$

$$\frac{5}{4}$$

for the third window, and correspondingly for successive windows, the radial spacing of the several windows being such that one window is located over each scale except the outer scale, and an index member extending radially from the axis of said device and beyond the periphery of said disk.

5. A calculating device comprising a base, a dial having a plurality of concentric logarithmic scales thereon, a mask covering all but one of said scales, said mask having windows each overlying one of said covered scales in angular displacement, means for rotatably mounting the mask and dial on the base, means providing a radial indicator overlying the mask and dial fixed on the base, and indicium means carried by the mask adjacent said one scale.

W. RODERIC BLISS.

REFERENCES CITED

The following references are of record in the file of this patent:

UNITED STATES PATENTS

| Number | Name | Date |
| --- | --- | --- |
| 331,264 | Tucker | Nov. 24, 1885 |
| 387,070 | Hart | July 31, 1888 |
| 809,294 | Fry | Jan. 9, 1906 |
| 1,919,222 | Jensen et al. | July 25, 1933 |
| 2,328,881 | Saunders | Sept. 7, 1943 |